United States Patent
Morita et al.

(10) Patent No.: US 10,560,286 B2
(45) Date of Patent: Feb. 11, 2020

(54) GATEWAY DEVICE AND CONTROL METHOD FOR THE SAME

(71) Applicant: HITACHI AUTOMOTIVE SYSTEMS, LTD., Ibaraki (JP)

(72) Inventors: Nobuyoshi Morita, Tokyo (JP); Makoto Kayashima, Tokyo (JP); Toru Owada, Tokyo (JP); Keisuke Hakuta, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 3 days.

(21) Appl. No.: 15/743,691

(22) PCT Filed: May 24, 2016

(86) PCT No.: PCT/JP2016/065246
§ 371 (c)(1),
(2) Date: Jan. 11, 2018

(87) PCT Pub. No.: WO2017/010172
PCT Pub. Date: Jan. 19, 2017

(65) Prior Publication Data
US 2018/0205576 A1   Jul. 19, 2018

(30) Foreign Application Priority Data

Jul. 15, 2015   (JP) .................................. 2015-141509

(51) Int. Cl.
*H04L 12/46* (2006.01)
*H04L 12/66* (2006.01)
(Continued)

(52) U.S. Cl.
CPC .............. *H04L 12/66* (2013.01); *G06F 21/64* (2013.01); *H04L 9/3242* (2013.01); *H04L 12/46* (2013.01); *H04L 63/1475* (2013.01)

(58) Field of Classification Search
CPC ......... G06F 21/64; H04L 12/46; H04L 12/66; H04L 63/123; H04L 63/1475; H04L 9/32; H04L 9/3242
See application file for complete search history.

(56) References Cited

U.S. PATENT DOCUMENTS 6,041,166 A * 3/2000 Hart ....................... G06F 9/542
 709/220
6,725,276 B1 * 4/2004 Hardjono ............ H04L 12/1836
 709/238
(Continued)

FOREIGN PATENT DOCUMENTS

JP  2007-013366 A  1/2007
JP  2007-135011 A  5/2007
(Continued)

OTHER PUBLICATIONS

International Search Report of PCT/JP2016/065246 dated Aug. 30, 2016.
(Continued)

*Primary Examiner* — Khaled M Kassim
*Assistant Examiner* — Zhaohui Yang
(74) *Attorney, Agent, or Firm* — Mattingly & Malur, PC

(57) ABSTRACT

A gateway device that relays a message between two or more domains receives a first message including a first message authentication code corresponding to a first domain among the two or more domains and first data from the first domain and transmits a second message including a second message authentication code corresponding to a second domain among the two or more domains and the first data to the second domain.

6 Claims, 11 Drawing Sheets

(51) Int. Cl.
*G06F 21/64* (2013.01)
*H04L 9/32* (2006.01)
*H04L 29/06* (2006.01)

(56) References Cited

U.S. PATENT DOCUMENTS

| | | | |
|---|---|---|---|
| 7,400,596 B1 * | 7/2008 | Robertson | H04L 12/189 |
| | | | 370/312 |
| 2008/0165968 A1 * | 7/2008 | Yadav | H04W 12/0013 |
| | | | 380/270 |
| 2015/0172298 A1 | 6/2015 | Otsuka | |

FOREIGN PATENT DOCUMENTS

| | | |
|---|---|---|
| JP | 2007-336267 A | 12/2007 |
| JP | 2012-141660 A | 7/2012 |
| JP | 2013-048374 A | 3/2013 |
| JP | 2014-141154 A | 8/2014 |
| JP | 2014-183395 A | 9/2014 |
| JP | 2015-114907 A | 6/2015 |
| WO | 00/62480 A2 | 10/2000 |

OTHER PUBLICATIONS

Extended European Search Report received in corresponding European Application No. 16824152.9 dated Jan. 2, 2019.

* cited by examiner

FIG. 6

152 — KEY INFORMATION

| DOMAIN (1521) | DOMAIN KEY (1522) |
|---|---|
| Dom 1 | $K_{Dom1}$ |
| Dom 2 | $K_{Dom2}$ |
| Dom 3 | $K_{Dom3}$ |
| ... | ... |
| Dom n | $K_{Dom\ n}$ |

FIG. 7

151 — MAC REPLACEMENT DETERMINATION INFORMATION

| CAN ID (1511) | COMMUNICATION RELATION DOMAIN (1512) | MAC REPLACEMENT NECESSITY (1513) | INTER-DOMAIN KEY TARGET (1514) |
|---|---|---|---|
| 0x101 | {Dom1、Dom2、Dom3} | REQUIRED | NOT APPLICABLE |
| ... | ... | ... | ... |
| 0x20A | {Dom3} | NO | NOT APPLICABLE |
| 0x32D | {Dom4、Dom5} | NO | APPLICABLE |
| ... | ... | ... | NOT APPLICABLE |

FIG. 11

| CAN-ID | USAGE KEY | DOMAIN KEY TARGET |
|---|---|---|
| 0x101 | $K_{Dom\_1}$ | APPLICABLE |
| 0x10A | $K_{Id\_0x10A}$ | NOT APPLICABLE |
| 0x30A | $K_{Dom\_3}$ | APPLICABLE |
| ... | ... | ... |
| n | $K_{Id\_n}$ | NOT APPLICABLE |

USAGE KEY INFORMATION (2141)

GATEWAY DEVICE AND CONTROL METHOD FOR THE SAME

TECHNICAL FIELD

The present invention relates to a gateway device and a control method therefor.

BACKGROUND ART

A controller area network (hereinafter, abbreviated as CAN) has become widespread as a representative standard protocol in automotive in-vehicle networks. In such an in-vehicle network, there is a danger that a replay attack will be performed by connecting unauthorized equipment to an interface directly linked to an in-vehicle network such as an on-board-diagnostics 2 (OBD2) port. Here, the replay attack is an attack that causes a false operation by eavesdropping on a message flowing on a communication path to acquire beforehand and retransmitting the acquired message.

Besides, there is also a danger that an information processing device that cooperates with a system outside the vehicle is infected with malware, the infected device transmits a fake message to the in-vehicle network, and a control device that received the message causes a malfunction.

In response to these threats, it is generally considered effective to carry out message authentication using a message authentication code (MAC) as a message authentication code for messages flowing between respective information processing devices. Since the MAC utilizes a key for encryption and is generated using a predetermined encryption algorithm, it is necessary to manage the key in each control device.

In regard to such a technique, PTL 1 discloses a technique in which security information (message authentication code) is included in a communication frame section together with a message class identifier and the security information is employed as a session key for communication by each regular node (Abstract).

CITATION LIST

Patent Literature

PTL 1: JP 2014-183395 A

SUMMARY OF INVENTION

Technical Problem

When the technique disclosed in PTL 1 is used, it can be confirmed that legitimate communication is performed. However, PTL 1 does not disclose a technique for managing the key. In an in-vehicle system, there is a restriction on the processing capability of each device and thus a technique with less burden also in key management is required.

Accordingly, the present invention has been made in view of the above disadvantages and it is an object of the present invention to reduce a management burden of a key for generating a message authentication code of a message.

Solution to Problem

In order to achieve the above object, a representative gateway device according to the present invention is a gateway device that relays a message between two or more domains, the gateway device receiving a first message including a first message authentication code corresponding to a first domain among the two or more domains and first data from the first domain and transmitting a second message including a second message authentication code corresponding to a second domain among the two or more domains and the first data to the second domain.

Advantageous Effects of Invention

According to the present invention, it is possible to reduce a management burden of a key for generating a message authentication code of a message.

BRIEF DESCRIPTION OF DRAWINGS

FIG. 6 is a diagram illustrating an example of a table configuration of key information.

FIG. 7 is a diagram illustrating an example of a table configuration of MAC replacement determination information.

FIG. 11 is a diagram illustrating an example of a table configuration of usage key information.

DESCRIPTION OF EMBODIMENTS

Hereinafter, embodiments of the present invention will be described in detail with reference to the drawings, using examples.

Example 1

Example 1 describes an example of key management that makes it possible that each control device manages a domain key shared for each domain and assigns a MAC calculated using the domain key to a message, and a GW device determines whether a received message is a MAC replacement target using a replacement processing unit and MAC replacement determination information, replaces the MAC of the message serving as the replacement target, and transmits the message to a communication destination domain using a routing processing unit.

However, the configuration of Example 1 is not limited to this example. In addition, it is preferable that the key for encryption used in each device be distributed and updated safely at arbitrary timing, for example, at the time of product development or maintenance.

Figure 1:
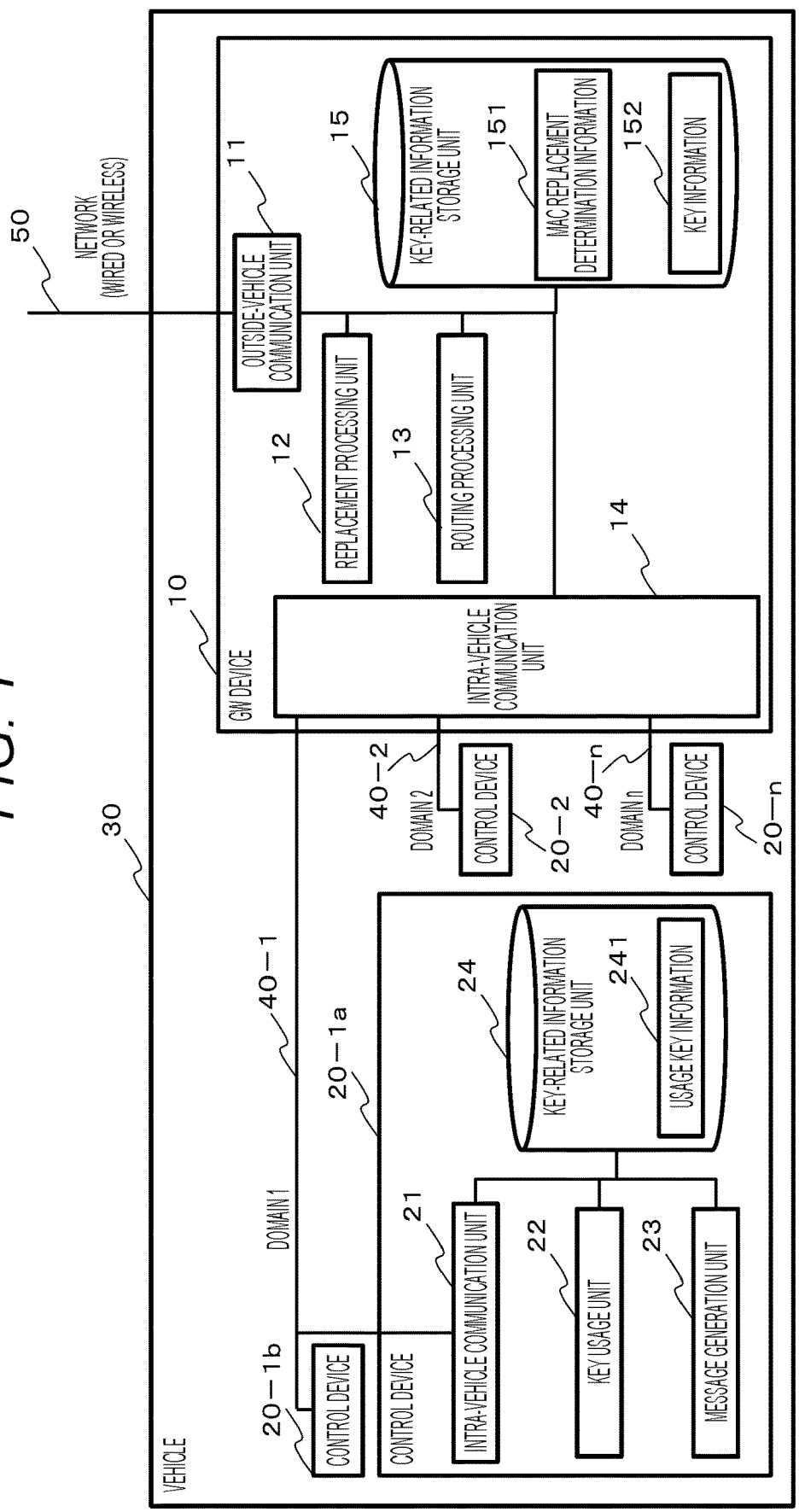
FIG. 1 is a diagram illustrating an example of the configuration of an in-vehicle system.

FIG. 1 is a diagram illustrating an example of the configuration of an in-vehicle system. A GW device 10 mounted on a vehicle 30 is interconnected with a control device 20 via an in-vehicle network 40. Note that in-vehicle networks 40-1, 40-2, ..., 40-n (n is a natural number equal to or larger than three) will be referred to as the in-vehicle network 40 when representatively expressed without being distinguished therebetween and control devices 20-1a, 20-1b, 20-2, ..., 20-n will be referred to as the control device 20 when representatively expressed without being distinguished therebetween.

Here, for example, CAN or CAN Flexible Data-Rate (FD) may be employed as the in-vehicle network 40. In addition, the number of in-vehicle networks 40 may be two and the number of domains may also be two.

The GW device 10 is constituted by an outside-vehicle communication unit 11, a replacement processing unit 12, a routing processing unit 13, an intra-vehicle communication unit 14, and a key-related information storage unit 15. The outside-vehicle communication unit 11 is connected to a device outside the vehicle 30, a center, or the like via a network (wired or wireless) 50 and transmits/receives messages to/from the outside of the vehicle. The replacement processing unit 12 determines whether a received message is a MAC replacement target.

The routing processing unit 13 locates the control device 20 of a communication destination based on a determination result of the replacement processing unit 12 and creates a message to be transmitted. The intra-vehicle communication unit 14 transmits the message generated by the routing processing unit 13 to the in-vehicle network 40 of an applicable domain. The key-related information storage unit 15 holds MAC replacement determination information 151 and key information 152.

The MAC replacement determination information 151 is information used for determining whether a message received by the replacement processing unit 12 is a replacement target. The key information 152 is key information on each domain divided by the GW device 10 and the replacement processing unit 12 calculates a MAC corresponding to a communication destination domain using a domain key acquired from the key information 152.

The control device 20 is constituted by an intra-vehicle communication unit 21, a key usage unit 22, a message generation unit 23, and a key-related information storage unit 24. The intra-vehicle communication unit 21 transmits a message to the in-vehicle network 40 or receives a message from the in-vehicle network 40. The key usage unit 22 selects a domain key set for the domain to which the control device 20 is connected and, for example, generates and verifies the MAC.

The message generation unit 23 assigns the MAC calculated using the domain key selected by the key usage unit 22 to generate a message. The key-related information storage unit 24 holds usage key information 241. The usage key information 241 is information on the domain key to be assigned to a message and the message generation unit 23 calculates the MAC using the domain key acquired from the usage key information 241.

Note that the control device 20 may be connected to sensor equipment, actuators, or the like (illustration is omitted) for controlling the vehicle 30 or may be provided therewith. In addition, a plurality of control devices 20 may be connected to one in-vehicle network 40 to belong to one domain like the control device 20-1a and the control device 20-1b connected to the in-vehicle network 40-1.

Furthermore, respective items of information, namely, the usage key information 241, the MAC replacement determination information 151, and the key information 152 may be set in advance from an input device (illustration is omitted) or may be set in advance by way of the network 50.

Figure 2:
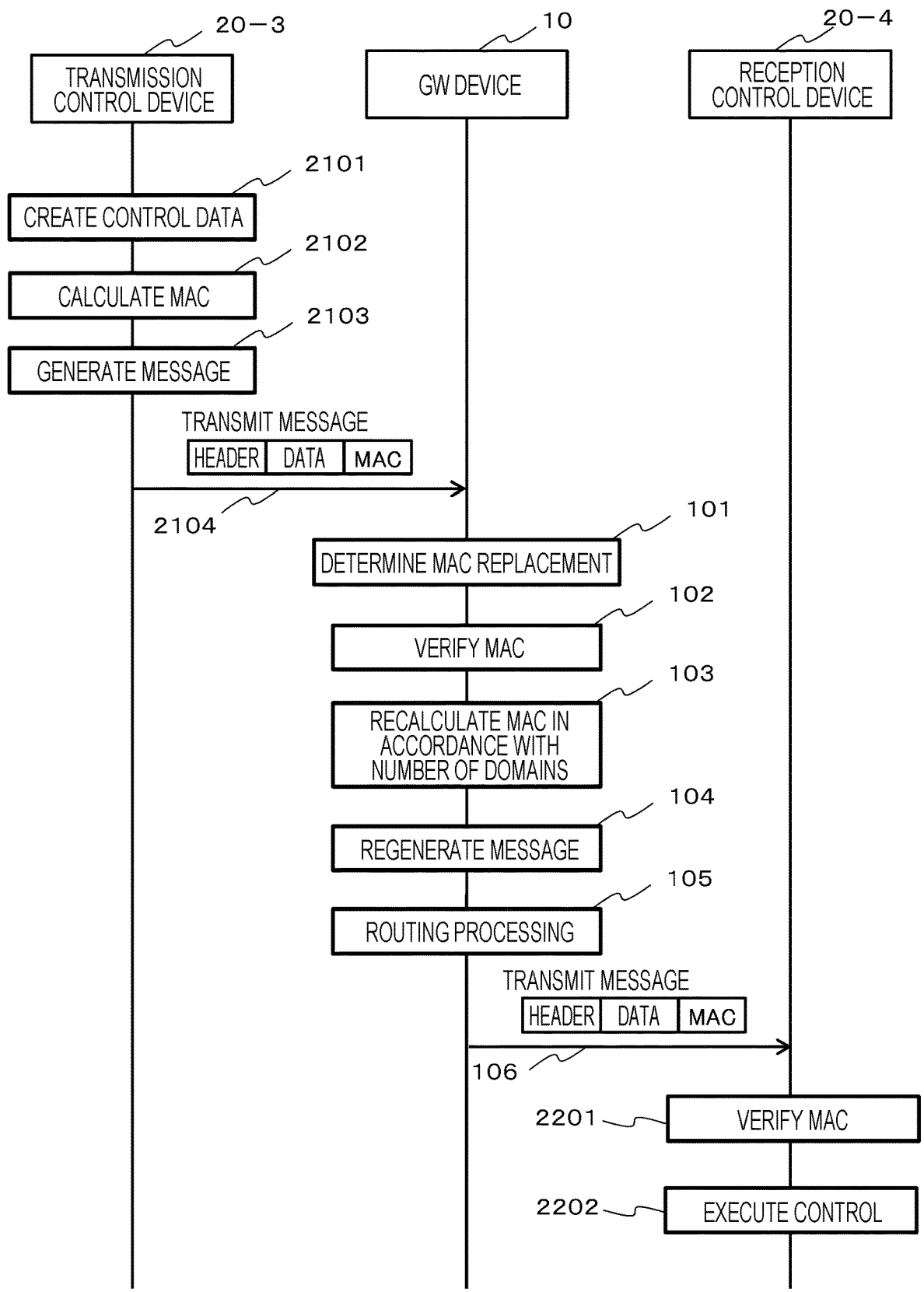
FIG. 2 is a diagram illustrating an example of a processing sequence of inter-domain communication.

FIG. 2 is a diagram illustrating an example of an overview processing sequence in inter-domain communication in which the control device 20 transmits a message to a control device 20 of a different domain via the GW device 10. Note that a transmission control device 20-3 and a reception control device 20-4 are cited as examples of the control device 20 to transmit and the control device 20 to receive from among the plurality of control devices 20 and have the same configurations as that of the control device 20.

The following steps 2101 to 2104 are processes of the transmission control device 20-3. In step 2101, the message generation unit 23 acquires control parameter information used for travel control of the vehicle 30, for example, from sensor equipment or the like provided in the transmission control device 20-3.

In step 2102, the key usage unit 22 acquires the domain key of a domain to which the transmission control device 20-3 is connected from the usage key information 241 and calculates the MAC using the acquired domain key. For example, the MAC may be calculated by specifying the acquired control parameter information as data of the message and specifying information necessary for transmitting/receiving ID information on the message and the like as a header of the message to apply the domain key to the data and the header. Alternatively, the MAC may be calculated by applying the domain key only to the data.

In step 2103, the message generation unit 23 generates a message for communication according to the control parameter information as the data of the message acquired in step 2101 and the MAC calculated in step 2102. Note that the message may include a header, a footer (illustration is omitted), or the like. In step 2104, the message generation unit 23 transmits the message generated in step 2103 to the in-vehicle network 40 using the intra-vehicle communication unit 21.

In step 101, the replacement processing unit 12 determines whether the ID information on the message received from the intra-vehicle communication unit 14 represents a MAC replacement target according to the MAC replacement determination information 151. When it is determined that the received message is the MAC replacement target, the process proceeds to step 102. When it is determined that the received message is not the MAC replacement target, this process is terminated and the process transitions to an error process.

FIG. 7 illustrates an example of a table configuration of the MAC replacement determination information 151 referred to in step 101. A CAN-ID column 1511 indicates information for identifying a message, that is, the ID information on the message. In FIG. 7, a CAN-ID is cited as an example of the information and the CAN-ID column 1511 is employed. However, information other than the CAN-ID may be used as long as the information can identify the message.

A communication relation domain column 1512 indicates a domain that has a communication relation with a message using the value of the CAN-ID column 1511. A MAC replacement necessity column 1513 indicates whether the message using the value of the CAN-ID column 1511 is a MAC replacement target or a non-target. When the value of the MAC replacement necessity column 1513 is "required", the MAC assigned to the message is a target to be replaced and, when the value is "no", the MAC assigned to the message is not a target to be replaced.

An inter-domain key target column 1514 indicates whether the message using the value of the CAN-ID column 1511 is a target of an inter-domain key or a non-target thereof. When the value of the inter-domain key target column 1514 is "applicable", this indicates that the message is a target of the calculation of the MAC using the inter-domain key and, when the value is "not applicable", this indicates that the inter-domain key is not used.

Here, the inter-domain key may be individually set for a message having a short cycle (high cycle), a message transmitted to a plurality of domains, a message given a priority in communication arbitration, a message communicated with a domain of high importance from the viewpoint of security or functional safety, or the like but is not limited to these examples. Note that the inter-domain key target column 1514 is used in Example 2.

In step 102, the replacement processing unit 12 calculates the MAC using the received message (the header and the data) and the domain key acquired from the key information 152 to compare the MAC assigned to the received message with the calculated MAC. When the values of the MACs coincide with each other, the process proceeds to step 103 and, when the values of the MACs do not coincide with each other, this process is terminated and the process transitions to the error process.

FIG. 6 illustrates an example of a table configuration of the key information 152 referred to in step 102. A domain column 1521 indicates a domain of the in-vehicle network (in-vehicle network 40) divided by the GW device 10. A domain key column 1522 indicates a domain key set for each domain in the domain column 1521.

The domain and the domain key in the table of the key information 152 may be set by displaying an input screen (illustration is omitted) to input a combination of the domain and the domain key separately. Alternatively, they may be set by displaying a domain set in advance on the input screen and displaying an input frame for the domain key corresponding to each domain to input a domain key to each input frame. Here, since there are cases in which two control devices, namely, the control device 20-1*a* and the control device 20-1*b* belong to a domain 1 as illustrated in FIG. 1, the number of the displayed input frames for the domain keys may be smaller than the number of the control devices 20.

In step 103, the replacement processing unit 12 locates the communication destination domain according to the domain of the in-vehicle network 40 from which the received message has been sent and the communication relation domain column 1512 and calculates the MAC according to the located communication destination domain using the domain key acquired from the key information 152. In step 104, the replacement processing unit 12 replaces the MAC of the received message with the MAC generated in step 103.

In step 105, the routing processing unit 13 acquires information on the domain as the communication destination located in step 103. Here, in step 103, the replacement processing unit 12 may save the information on the communication destination domain in a temporary memory (illustration is omitted). In step 106, the routing processing unit 13 transmits the message generated in step 104 to the in-vehicle network 40 of the domain as the communication destination acquired in step 105.

Note that the processes from steps 103 to 106 are repeated as many times as the number of communication destination domains.

The following steps 2201 to 2202 are processes of the reception control device 20-4. In step 2201, the key usage unit 22 acquires the domain key of a domain to which the reception control device 20-4 is connected from the usage key information 241 and calculates the MAC according to the received message (the header and the data) to compare the calculated MAC with the MAC assigned to the received message.

When the values of the MACs coincide with each other, the process proceeds to step 2202 and, when the values of the MACs do not coincide with each other, this process is terminated and the process transitions to the error process. In step 2202, the travel control is carried out according to the control parameter information which is the data of the message received by the reception control device 20-4.

Through the above steps, the control device 20 can transmit a message to a control device 20 of a different domain in the inter-domain communication via the GW device 10. Note that, in order to reduce a process load of the GW device 10, a MAC verification process in step 102 may be omitted.

In addition, since the MAC is generated by a predetermined encryption algorithm using a key for encryption, encrypted data may be generated instead of MAC generation and included in the message such that data from which the encryption has been performed is not included in the message when the message is transmitted. In a case where the encrypted data is included in a message and transmitted as mentioned above, the MAC verification process of determining whether the values of the MACs coincide with each other by comparison may be omitted.

Figure 3:
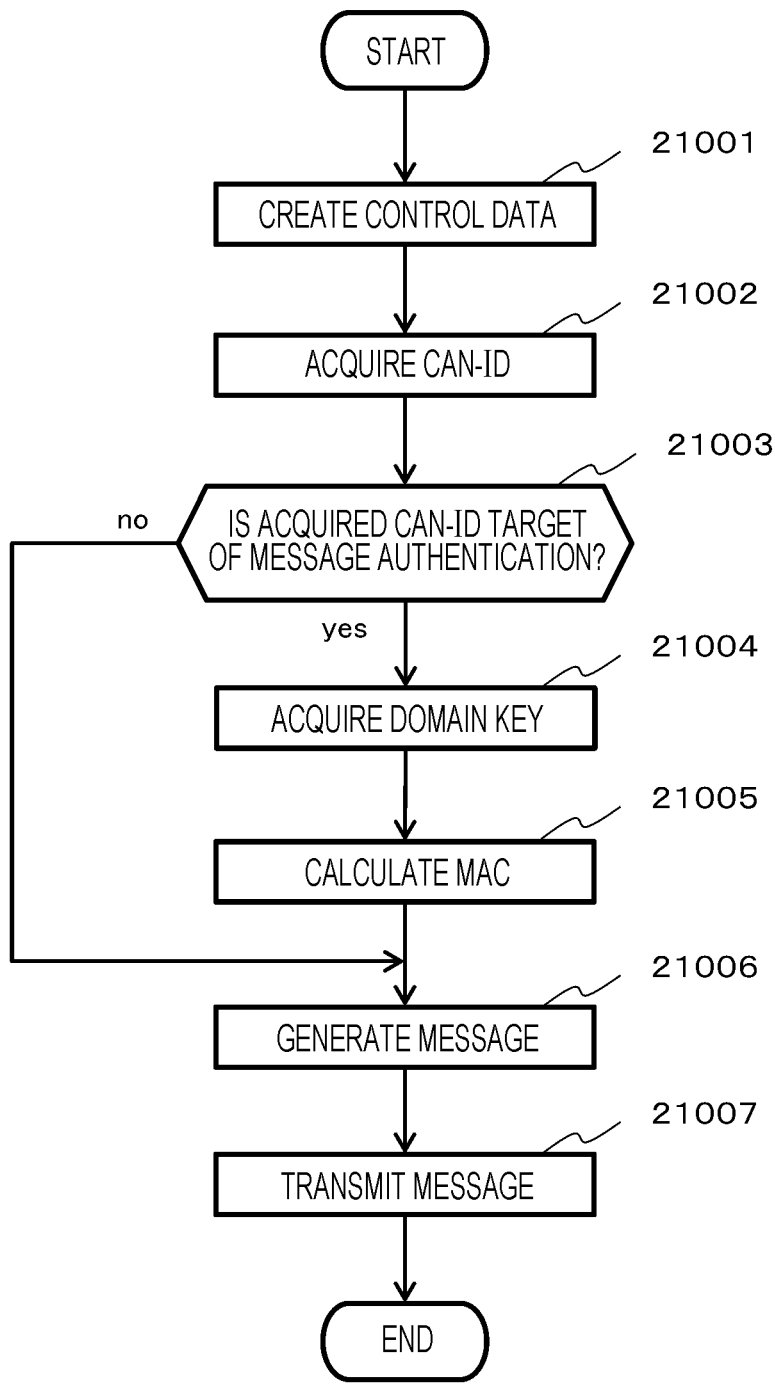
FIG. 3 is a diagram illustrating an example of a processing flow of a transmission control device.

FIG. 3 is a diagram illustrating an example of a detailed processing flow of the transmission control device 20-3 from step 2101 to step 2104 in FIG. 2. In step 21001, the message generation unit 23 acquires the control parameter information used for the travel control of the vehicle, for example, from sensor equipment or the like provided in the transmission control device 20-3.

In step 21002, the message generation unit 23 acquires the CAN-ID corresponding to the control parameter information acquired in step 21001. Note that the CAN-ID is set in advance in accordance with the type of the control parameter information and is stored in a memory (illustration is omitted) or the like.

In step 21003, the key usage unit 22 determines whether the CAN-ID acquired in step 21002 is a target of message authentication. When the CAN-ID is a target of message authentication, the process proceeds to step 21004 and, when the CAN-ID is not a target of message authentication, the process proceeds to step 21006. Note that a list of the CAN-IDs as targets of message authentication is set in advance and stored in a memory (illustration is omitted) or the like.

In step 21004, the key usage unit 22 acquires the domain key of a domain to which the transmission control device 20-3 is connected from the usage key information 241. In step 21005, the key usage unit 22 calculates the MAC using the domain key acquired in step 21004.

In step 21006, when the CAN-ID is not specified as a target of message authentication in step 21003, the message generation unit 23 generates a communication message according to the control parameter information acquired in step 21001. On the other hand, when the CAN-ID is specified as a target of message authentication in step 21003, a message for communication is generated according to the control parameter information acquired in step 21001 and the MAC calculated in step 21005.

In step 21007, the message generation unit 23 transmits the message generated in step 21006 to the in-vehicle network 40 using the intra-vehicle communication unit 21.

Through above steps 21001 to 21007, the transmission control device 20-3 can transmit a message to which the MAC calculated using the domain key has been assigned to the in-vehicle network 40.

Figure 4:
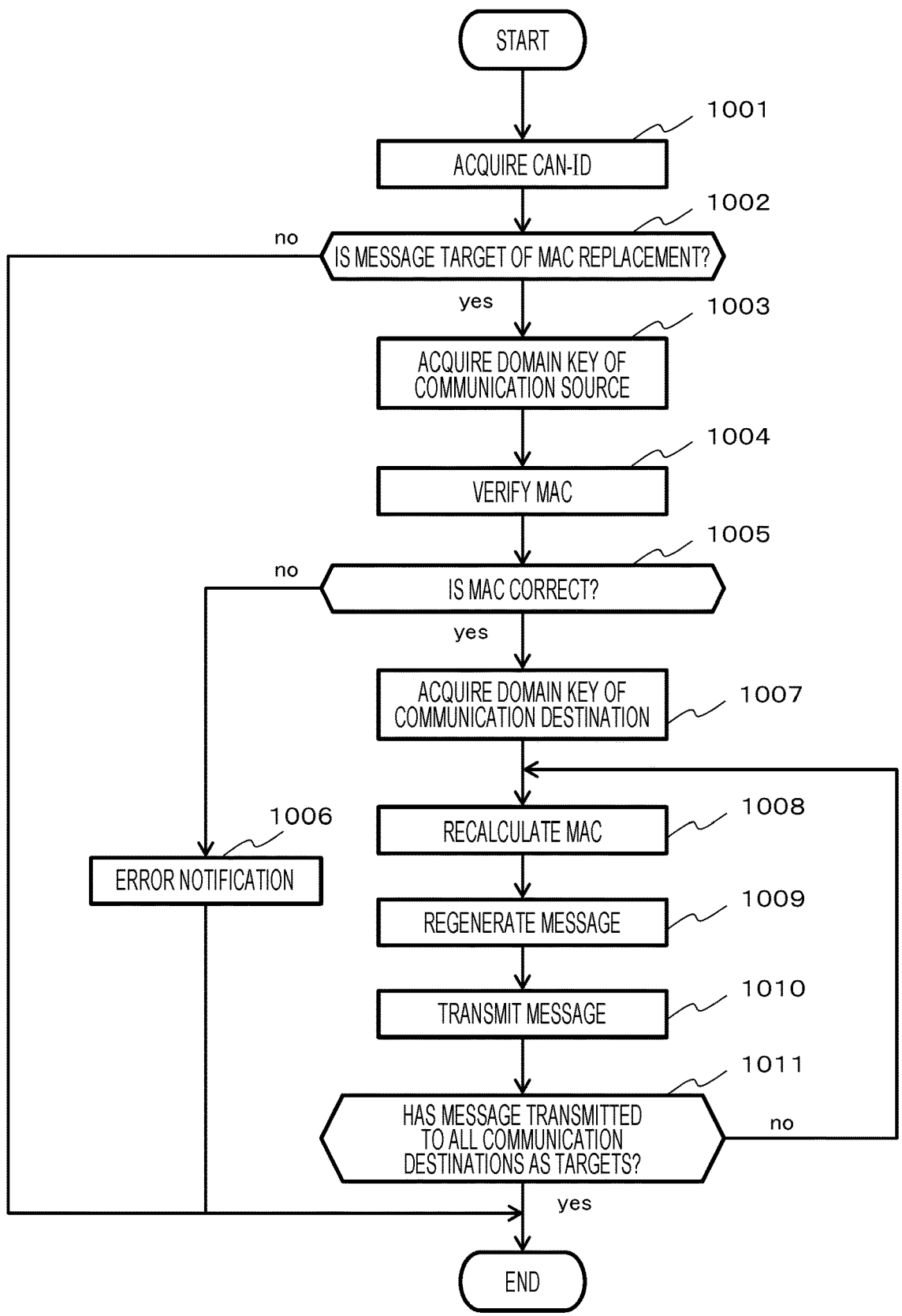
FIG. 4 is a diagram illustrating an example of a processing flow of a GW device.

FIG. 4 is a diagram illustrating an example of a detailed processing flow of the GW device 10 from step 101 to step 106 in FIG. 2. In step 1001, the replacement processing unit 12 acquires the CAN-ID assigned to the received message.

In step 1002, the replacement processing unit 12 refers to the MAC replacement determination information 151 to acquire information in the MAC replacement necessity column 1513 corresponding to the CAN-ID in the CAN-ID column 1511 coincident with the CAN-ID acquired in step 1001. When the acquired information in the MAC replacement necessity column 1513 is "required", the process proceeds to step 1003 and, when the acquired information is "no", this process is terminated.

In step 1003, the replacement processing unit 12 acquires the domain of the in-vehicle network 40 from which the received message has been sent, that is, the communication source domain and acquires the domain key in the domain key column 1522 corresponding to the domain in the domain column 1521 coincident with the acquired domain.

Here, the in-vehicle network 40-1 of the domain 1, the in-vehicle network 40-2 of a domain 2, the in-vehicle network 40-n of a domain n may be independently connected to the intra-vehicle communication unit 14 as in the example illustrated in FIG. 1 such that the domain of the in-vehicle network 40 from which the received message has been sent is acquired in accordance with which connection is used when the message is received from the in-vehicle network 40, or such that the message contains information for locating the domain and the domain is acquired from that information.

In step 1004, the replacement processing unit 12 calculates the MAC using the received message and the domain key acquired in step 1003 and compares the MAC assigned to the received message with the calculated MAC to verify. Here, it is assumed that the values of the two MACs coincident with each other are correct, whereas the values not coincident with each other are incorrect.

In step 1005, as a result of the comparison of the MACs in step 1004, when the MACs coincide with each other and are correct, the replacement processing unit 12 proceeds to step 1007. When the MACs do not coincide with each other and are incorrect, the replacement processing unit 12 proceeds to step 1006. In step 1006, the replacement processing unit 12, for example, notifies each control device and the like by way of the in-vehicle network 40 that an error has occurred and terminates this process.

In step 1007, the replacement processing unit 12 acquires the domain in the communication relation domain column 1512 corresponding to the CAN-ID in the CAN-ID column 1511 coincident with the CAN-ID acquired in step 1001. Among these domains acquired from the communication relation domain column 1512, a domain other than the communication source domain acquired in step 1003 is acquired as the communication destination domain. Then, the domain key in the domain key column 1522 corresponding to the domain in the domain column 1521 coincident with the acquired communication destination domain is acquired from the key information 152.

In step 1008, the replacement processing unit 12 calculates the MAC using the received message and the domain key of the communication destination domain acquired in step 1007. In step 1009, the replacement processing unit 12 assigns the MAC calculated in step 1008 to the received message instead of the MAC assigned thereto and regenerates the message.

In step 1010, the routing processing unit 13 transmits the message generated in step 1009 to the in-vehicle network 40 of the domain as the communication destination acquired in step 1007.

In step 1011, when the routing processing unit 13 has transmitted the message generated in step 1009 to all the communication destination domains as the targets, this process is terminated and, when the routing processing unit cannot transmit the message to all the communication destination domains as the targets, the process returns to step 1008.

As the determination in step 1011, for example, the total number of domains as communication destinations acquired in step 1007 and the number of transmitted messages may be managed such that the number of messages is counted up each time a message is transmitted and the determination may be made by comparing the total number of domains as communication destinations with the number of transmitted messages.

Through above steps 1001 to 1011, the GW device 10 can transfer the message to the domain as the communication destination after replacing the MAC of the message requiring the MAC replacement.

Figure 5:
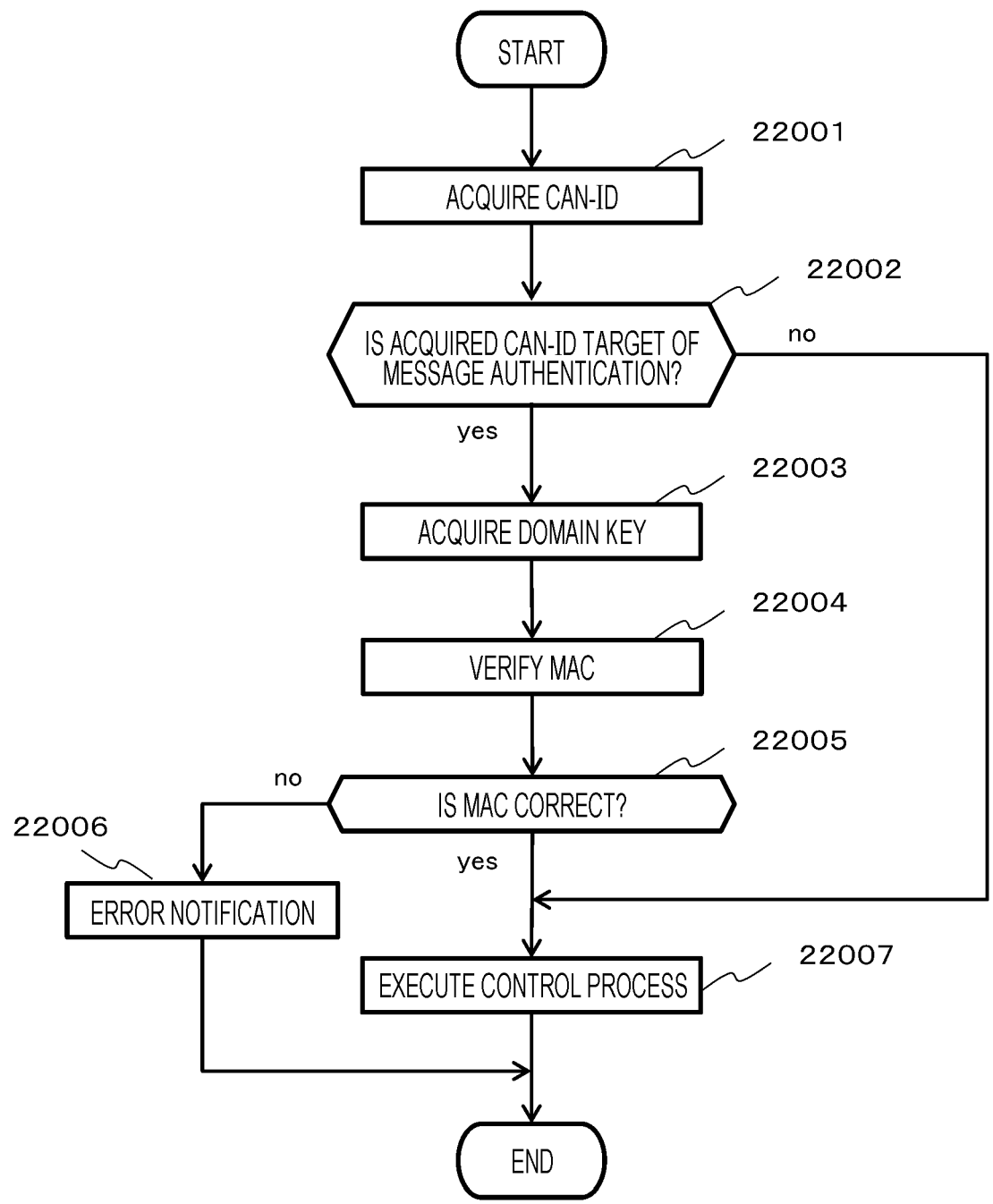
FIG. 5 is a diagram illustrating an example of a processing flow of a reception control device.

FIG. 5 is a diagram illustrating an example of a detailed processing flow of the reception control device 20-4 from step 2201 to step 2202 in FIG. 2. In step 22001, the key usage unit 22 acquires the CAN-ID assigned to the received message.

In step 22002, the key usage unit 22 determines whether the CAN-ID acquired in step 22002 is a target of message authentication. When the CAN-ID is a target of message authentication, the process proceeds to step 22003 and, when the CAN-ID is not a target of message authentication, the process proceeds to step 22007. Note that a list of the CAN-IDs as targets of message authentication is set in advance and stored in a memory (illustration is omitted) or the like.

In step 22003, the key usage unit 22 acquires the domain key applicable to a domain of the in-vehicle network 40 to which the reception control device 20-4 is connected from the usage key information 241. In step 22004, the key usage unit 22 calculates the MAC using the received message and the domain key acquired in step 22003 and compares the MAC assigned to the received message with the calculated MAC to verify. Here, it is assumed that the values of the MACs coincident with each other are correct, whereas the values not coincident with each other are incorrect.

In step 22005, as a result of the comparison of the MACs in step 22004, when the MACs coincide with each other and are correct, the key usage unit 22 proceeds to step 22007. When the MACs do not coincide with each other and are incorrect, the key usage unit 22 proceeds to step 22006. In step 22006, the key usage unit 22, for example, notifies each control device and the like by way of the in-vehicle network 40 that an error has occurred and terminates this process. In step 22007, the reception control device 20-4 carries out the travel control according to the received message.

Through above steps 22001 to 22007, the reception control device 20-4 can verify the MAC using the domain key for the message received via the in-vehicle network 40 and can carry out the travel control.

As described above, according to Example 1, each control device 20 can manage a domain key shared for each domain and the GW device 10 can determine whether the received message is a MAC replacement target, replace the MAC of the message serving as the replacement target, and transmit the message to the communication destination domain.

As a result, since it is sufficient to manage the domain key, it is possible to decrease the number of keys to be managed and to decrease the load of updating the key as compared with the configuration that manages the key for each control device 20. Additionally, the key also can be managed even in a system having a restraint on the processing capability of the GW device 10 like the in-vehicle system. Furthermore, even if one key is leaked, the influence as the in-vehicle system can be suppressed.

Note that, although Example 1 has described an example in which the in-vehicle network is targeted, the present invention is not limited to this example and also can be applied to devices in other control system and information system.

Example 2

As Example 2, an example of key management will be described in which each control device manages also an inter-domain key shared between domains in addition to the domain key shared for each domain and assigns the MAC calculated using the domain key or the inter-domain key to a message based on the ID information on the message, and a GW device determines whether the received message is a MAC replacement target using a replacement processing unit and the MAC replacement determination information, while determining whether the key used for calculating the MAC is the domain key or the inter-domain key, and transmits a message to the communication destination domain using a routing processing unit after replacing the MAC for a message using the domain key and without replacing the MAC for a message using the inter-domain key, whereby the process load on the GW device can be reduced.

The configuration of an in-vehicle system is the same as the configuration of Example 1 described with reference to FIG. 1 except that the usage key information 241 of the control device 20 is substituted by a usage key information 2141 and the operation of each member is different from that in Example 1 as described below.

Figure 8:
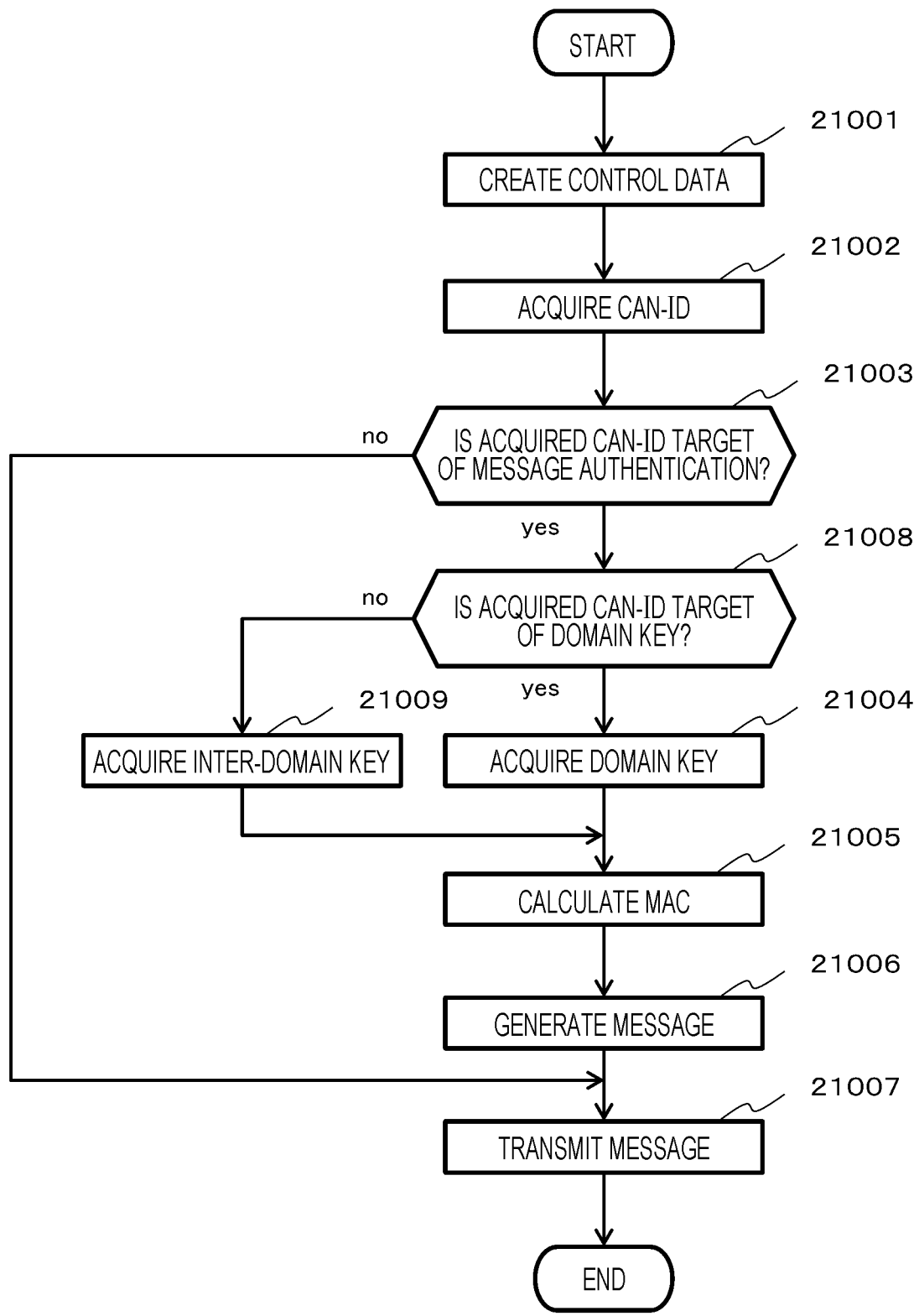
FIG. 8 is a diagram illustrating an example of a processing flow of the transmission control device including an inter-domain key process.

FIG. 8 is a diagram illustrating an example of a detailed processing flow of a transmission control device 20-3 that determines the type of a key to be used for calculating the MAC between steps 21003 and 21005 in FIG. 3. Each step of steps 21001 to 21003 is the same as each step of steps 21001 to 21003 of Example 1 described with reference to FIG. 3.

In step 21008, a key usage unit 22 refers to the usage key information 2141 described with reference to FIG. 11 to determine whether the CAN-ID acquired in step 21002 is a target of the domain key. When the CAN-ID is a target of the domain key, the process proceeds to step 21004 and, when the CAN-ID is not a target of the domain key, the process proceeds to step 21009.

FIG. 11 illustrates an example of a table configuration of the usage key information 2141 referred to in step 21008. A CAN-ID column 21411 indicates information for identifying a message. Information other than the CAN-ID may be used as long as the Information can identify the message. A usage key column 21412 indicates key information used for MAC generation in accordance with the CAN-ID in the CAN-ID column 21411. A domain key target column 21413 indicates whether the message identified by the CAN-ID in the CAN-ID column 21411 is a target of the domain key.

For example, in step 21008, the key usage unit 22 acquires information in the domain key target column 21413 corresponding to the CAN-ID in the CAN-ID column 21411 coincident with the CAN-ID acquired in step 21002. When the information in the domain key target column 21413 is "applicable", the domain key is used in MAC generation and, when the information is "not applicable", the inter-domain key is used in MAC generation.

Therefore, in step 21009, the key usage unit 22 acquires the inter-domain key in the usage key column 21412 corresponding to the CAN-ID in the CAN-ID column 21411 coincident with the CAN-ID acquired in step 21002.

Each step of steps 21004 to 21007 is the same as each step of steps 21004 to 21007 of Example 1 described with reference to FIG. 3.

Through above steps 21001 to 21009, a transmission control device 20-3 can generate the MAC using the domain key or the inter-domain key in accordance with the CAN-ID of the message.

Figure 9:
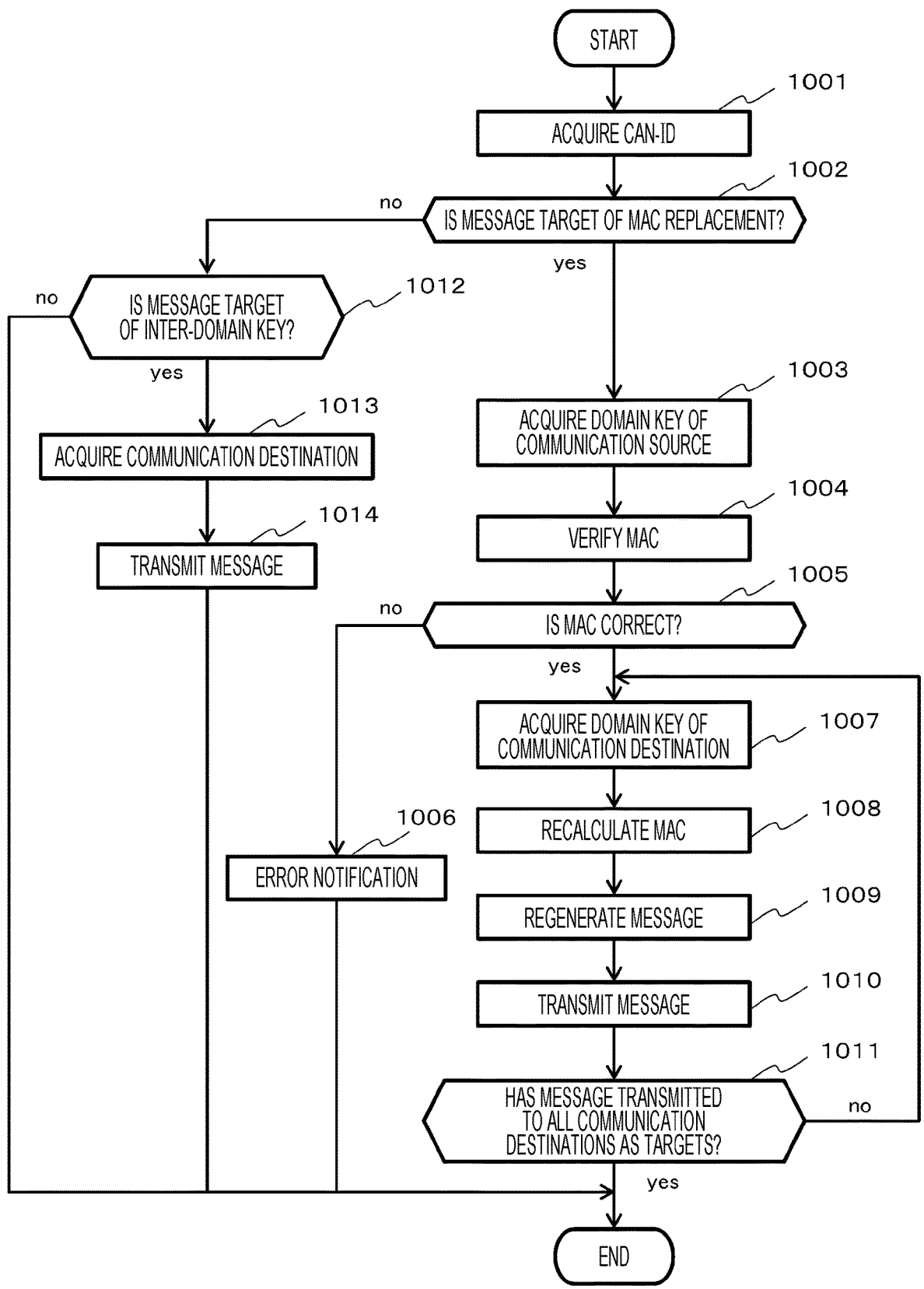
FIG. 9 is a diagram illustrating an example of a processing flow of the GW device including the inter-domain key process.

FIG. 9 is a diagram illustrating an example of a detailed processing flow of a GW device 10 that determines whether a message is a target of the inter-domain key when it is determined in step 1002 of FIG. 4 that the message is not a MAC replacement target. Each step of step 1001 and steps 1003 to 1011 is the same as each step of step 1001 and steps 1003 to 1011 of Example 1 described with reference to FIG. 4.

In step 1002, the replacement processing unit 12 refers to MAC replacement determination information 151 to acquire information in a MAC replacement necessity column 1513 corresponding to the CAN-ID in a CAN-ID column 1511 coincident with the CAN-ID acquired in step 1001. When the acquired information in the MAC replacement necessity column 1513 is "required", the process proceeds to step 1003 and, when the acquired information is "no", the process proceeds to step 1012.

In step 1012, the replacement processing unit 12 refers to the MAC replacement determination information 151 to acquire information in the inter-domain key target column 1514 corresponding to the CAN-ID in the CAN-ID column 1511 coincident with the CAN-ID acquired in step 1001. When the acquired information in the inter-domain key target column 1514 is "applicable", the process proceeds to step 1013 and, when the acquired information is "not applicable", this process is terminated.

In step 1013, the replacement processing unit 12 acquires the domain of the in-vehicle network 40 from which the received message has been sent, that is, the communication source domain. Then, the domain in a communication relation domain column 1512 coincident with the CAN-ID acquired in step 1001 is acquired and, among these domains acquired from the communication relation domain column 1512, a domain other than the communication source domain is acquired as the communication destination domain.

In step 1014, a routing processing unit 13 transmits the received message to the in-vehicle networks 40 of all the domains as the communication destinations acquired in step 1013.

Through above steps 1001 to 1014, the GW device 10 can transmit the message to the domain as the communication destination in accordance with the CAN-ID after replacing the MAC of the message to which the MAC using the domain key is assigned or without replacing the MAC of the message to which the MAC using the inter-domain key is assigned. When the MAC is not replaced, the process load of the GW device 10 can be reduced.

Figure 10:
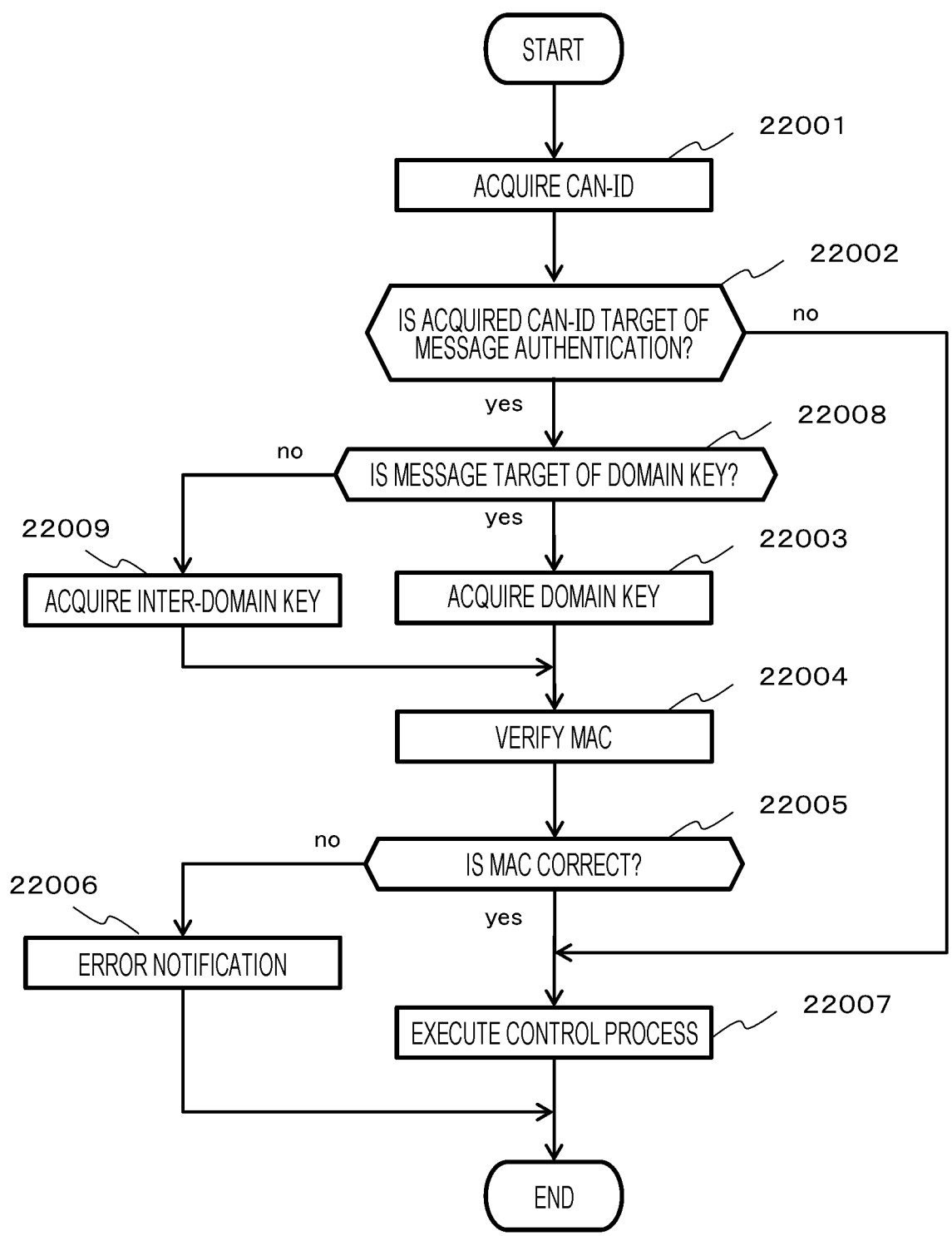
FIG. 10 is a diagram illustrating an example of a processing flow of the reception control device including the inter-domain key process.

FIG. 10 is a diagram illustrating an example of a detailed processing flow of a reception control device 20-4 that determines the type of a key to be used for verifying the MAC between steps 22002 and 22004 in FIG. 5. Each step of steps 22001 and 22002 is the same as each step of steps 22001 and 22002 of Example 1 described with reference to FIG. 5.

In step 22008, the key usage unit 22 refers to the usage key information 2141 to acquire information in the domain key target column 21413 corresponding to the CAN-ID in the CAN-ID column 21411 coincident with the CAN-ID acquired in step 22001. When the information in the domain key target column 21413 is "applicable", the process proceeds to step 22003 and, when the information is "not applicable", the process proceeds to step 22009.

In step 22009, the key usage unit 22 refers to the usage key information 2141 to acquire the inter-domain key in the usage key column 21412 corresponding to the CAN-ID in the CAN-ID column 21411 coincident with the CAN-ID acquired in step 22001.

Each step of steps 22003 to 22007 is the same as each step of steps 22003 to 22007 of Example 1 described with reference to FIG. 5.

Through above steps 22001 to 22009, the reception control device 20-4 can verify the MAC using the domain key or the inter-domain key in accordance with the CAN-ID.

As described above, according to Example 2, each control device 20 manages the inter-domain key shared between domains in addition to the domain key shared for each domain, and the GW device 10 transmits a message to the domain as the communication destination in accordance with the CAN-ID after replacing the MAC of the message to which the MAC using the domain key is assigned or without replacing the MAC of the message to which the MAC using the inter-domain key is assigned, whereby the process load of the GW device 10 can be reduced.

Example 3

As Example 3, an example of key management will be described in which each control device assigns a nonce (disposable number) to a message, and a GW device determines whether the nonce assigned to the received message is correct and transmits a message to the communication destination domain, whereby the process load on the GW device can be reduced. The configuration of an in-vehicle system may be the same as the configuration of Example 1 described with reference to FIG. 1.

Figure 12:
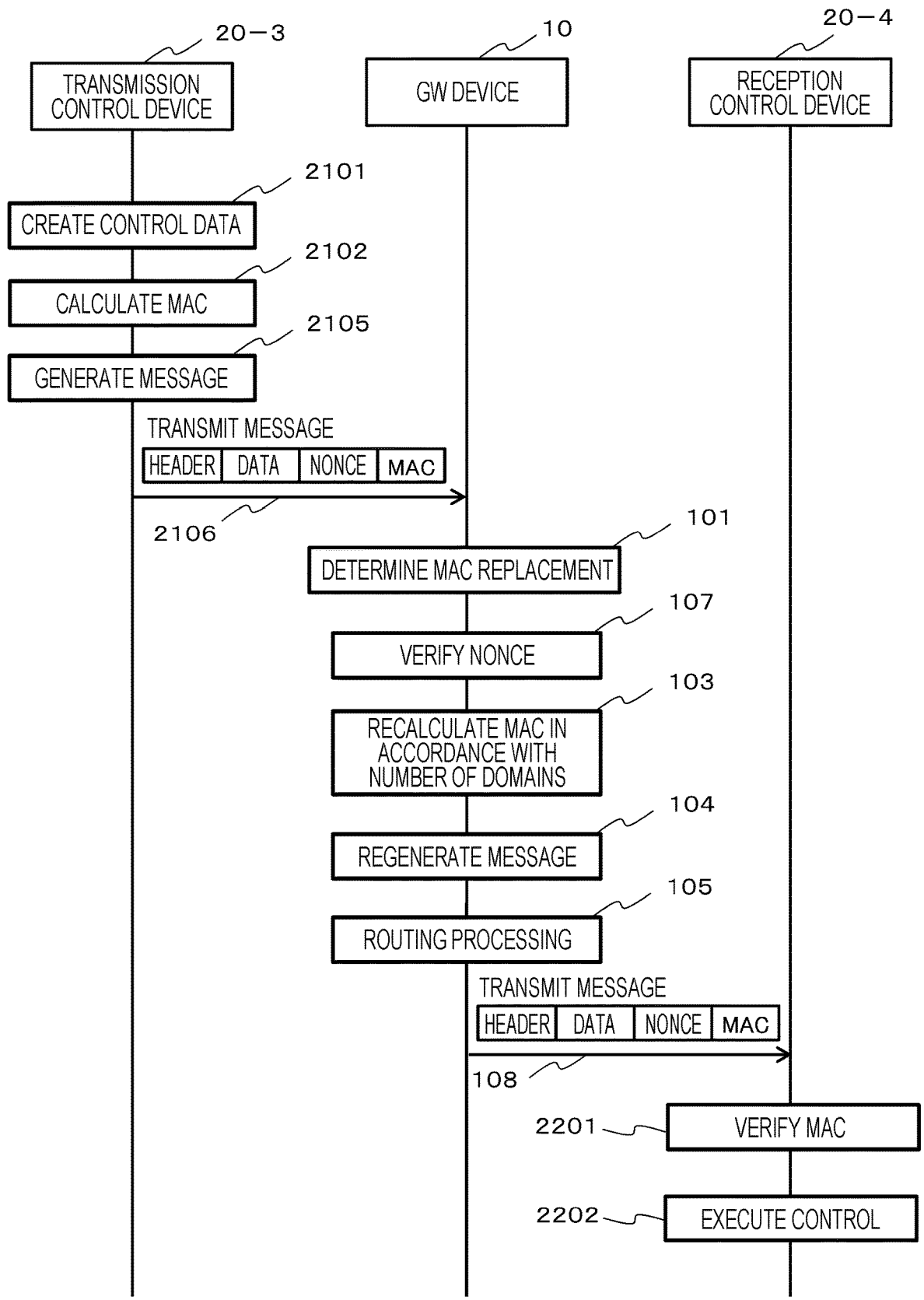
FIG. 12 is a diagram illustrating an example of a processing sequence for the inter-domain communication including a nonce.

FIG. 12 is a diagram illustrating an example of an overview processing sequence in the inter-domain communication obtained by adding processes for the nonce to steps 2103, 102, and 104 in FIG. 2. Each step of steps 2101 and 2102 of a transmission control device 20-3 is the same as each step of steps 2101 and 2102 of Example 1 described with reference to FIG. 2.

In step 2105, a message generation unit 23 generates the value of a nonce and creates a message for communication according to the control parameter information as the data of the message, the MAC, and the nonce. Here, the message may include a header, a footer (illustration is omitted), or the like. In step 2106, the message generation unit 23 transmits the message including the nonce and generated in step 2105 to an in-vehicle network 40 using an intra-vehicle communication unit 21.

The value of the nonce may be, for example, a sequence number of communication, a random number, or the like. In order for the transmission control device 20-3 and the GW device 10 to obtain the same value of the nonce, the transmission control device 20-3 and the GW device 10 may communicate the value of the nonce at any time point before the step 2106, or each of the transmission control device 20-3 and the GW device 10 may be provided with a generation circuit that realizes the same algorithm to generate the same value of the nonce using each generation circuit thereof, or communication may be performed to synchronize the value of the nonce between generation circuits of the transmission control device 20-3 and the GW device 10 which realize the same algorithm.

Each step of step 101 and steps 103 to 105 of the GW device 10 is the same as each step of step 101 and steps 103 to 105 of Example 1 described with reference to FIG. 2. In step 107, a replacement processing unit 12 generates the value of the nonce to compare the value of the nonce of the received message with the value of the generated nonce. When the values of the nonces coincide with each other, the process proceeds to step 103 and, when the values of the nonces do not coincide with each other, this process is terminated and the process transitions to the error process.

In step 108, a routing processing unit 13 transmits the message including the nonce and generated in step 104 to the in-vehicle network 40 of the domain as the communication destination acquired in step 105. In this example, the message including the nonce is employed to unify the format of the message.

Each step of steps 2201 and 2202 of a reception control device 20-4 is the same as each step of steps 2201 and 2202 of Example 1 described with reference to FIG. 2.

Note that, since the value of the nonce is not verified in step 2201, the message may be transmitted without including the nonce therein in step 108. Conversely, also the reception control device 20-4 may generate the value of the nonce such that, in step 2201, the key usage unit 22 verifies the coincidence of the values of the nonces by comparison in addition to the verification of the coincidence of the values of the MACs by comparison.

As described above, according to Example 3, each control device 20 assigns the nonce to transmit a message and the GW device 10 can verify the received message with the nonce, whereby the process load of the GW device 10 can be reduced.

REFERENCE SIGNS LIST

10 GW device
20 control device
30 vehicle
40 in-vehicle network

The invention claimed is:

1. A gateway device that relays a message between two or more domains, the gateway device comprising:
   at least one processor; and
   a storage,
   wherein the at least one processor is configured to:
   receive a first message including a first message authentication code corresponding to a first domain among the two or more domains and first data from the first domain;

transmit a second message including a second message authentication code corresponding to a second domain among the two or more domains and the first data to the second domain;
manage domain keys corresponding to each of the first domain and the second domain;
generate the second message authentication code based on one of the domain keys corresponding to the second domain and the first data;
generate the second message including the first data and the second message authentication code;
transmit the second message to the second domain;
determine whether to generate the second message based on ID information for identifying the first message included in the first message;
locate the second domain;
generate a message authentication code based on one of the domain keys corresponding to the first domain and the first data;
upon comparing the message authentication code with the first message authentication code included in the first message and determining that the message authentication codes coincide with each other, generate the second message authentication code and generate the second message to transmit the second message;
generate a disposable number; and
upon comparing the disposable number with a disposable number included in the first message and determining that the disposable numbers coincide with each other, generate the second message authentication code and generate the second message to transmit the second message.

2. The gateway device according to claim 1,
wherein the at least one processor is further configured to transmit a third message including a third message authentication code corresponding to a third domain among the two or more domains and the first data to the third domain.

3. A gateway device that relays a message between two or more domains, the gateway device comprising:
at least one processor; and
a storage,
wherein the at least one processor is configured to:
receive a first message including a first message authentication code corresponding to a first domain among the two or more domains and first data from the first domain;
transmit a second message including a second message authentication code corresponding to a second domain among the two or more domains and the first data to the second domain;
manage domain keys corresponding to each of the first domain and the second domain;
generate the second message authentication code based on one of the domain keys corresponding to the second domain and the first data;
generate the second message including the first data and the second message authentication code;
transmit the second message to the second domain;
generate a message authentication code based on one of the domain keys corresponding to the first domain and the first data;
upon comparing the message authentication code with the first message authentication code included in the first message and determining that the message authentication codes coincide with each other, generate the second message authentication code and generate the second message to transmit the second message;
manage a plurality of domains through which transmission and reception are performed with respect to ID information for identifying a message;
locate a plurality of domains through which the first message is transmitted and received based on the ID information for identifying the first message; and
locate a domain excluding the first domain among the located plurality of domains as a transmission destination domain.

4. The gateway device according to claim 3, wherein the at least one processor is further configured to:
manage an inter-domain key common to a fourth domain and the first domain among the two or more domains; and
upon determining not to generate the second message based on the ID information, transmit the first message to the fourth domain in a case where the first message is determined to be a target of the inter-domain key.

5. A control method for a gateway device that relays a message between two or more domains comprising the steps of:
receiving a first message including a first message authentication code corresponding to a first domain among the two or more domains and first data from the first domain;
transmitting a second message including a second message authentication code corresponding to a second domain among the two or more domains and the first data to the second domain;
managing domain keys corresponding to each of the first domain and the second domain;
generating the second message authentication code based on one of the domain keys corresponding to the second domain and the first data;
generating the second message including the first data and the second message authentication code;
transmitting the second message to the second domain;
generating a message authentication code based on one of the domain keys corresponding to the first domain and the first data;
upon comparing the message authentication code with the first message authentication code included in the first message and determining that the message authentication codes coincide with each other, generating the second message authentication code and generating the second message to transmit the second message;
managing a plurality of domains through which transmission and reception are performed with respect to ID information for identifying a message;
locating a plurality of domains through which the first message is transmitted and received based on the ID information for identifying the first message; and
locating a domain excluding the first domain among the located plurality of domains as a transmission destination domain.

6. The control method according to claim 5, further comprising the steps of:
determining whether to generate the second message based on ID information for identifying the first message included in the first message; and
locating the second domain.

* * * * *